(12) United States Patent
Chung

(10) Patent No.: US 8,421,970 B2
(45) Date of Patent: Apr. 16, 2013

(54) LIQUID CRYSTAL DISPLAY DEVICE HAVING A PIXEL ELECTRODE PATTERN FORMED BY USING AN ALIGNMENT LAYER PATTERN AS THE MASK AND METHOD FOR MANUFACTURING THE SAME

(75) Inventor: Byung Hyuck Chung, Seoul (KR)

(73) Assignee: LG Display Co., Ltd., Seoul (KR)

( * ) Notice: Subject to any disclaimer, the term of this patent is extended or adjusted under 35 U.S.C. 154(b) by 1119 days.

(21) Appl. No.: 11/639,312

(22) Filed: Dec. 15, 2006

(65) Prior Publication Data

US 2008/0002138 A1    Jan. 3, 2008

(30) Foreign Application Priority Data

Jun. 29, 2006  (KR) .................. 10-2006-0059234

(51) Int. Cl.
*G02F 1/1337*  (2006.01)
*G02F 1/1343*  (2006.01)
*G02F 1/13*  (2006.01)

(52) U.S. Cl.
USPC ............................ 349/123; 349/139; 349/187

(58) Field of Classification Search .................. 349/187, 349/123, 139
See application file for complete search history.

(56) References Cited

U.S. PATENT DOCUMENTS

| 6,559,916 | B1 * | 5/2003 | Urabe et al. | 349/113 |
| 2001/0048499 | A1 * | 12/2001 | Numano et al. | 349/123 |
| 2003/0223030 | A1 * | 12/2003 | Byun et al. | 349/187 |
| 2006/0244893 | A1 * | 11/2006 | Oda | 349/151 |

FOREIGN PATENT DOCUMENTS

| JP | 01-169427 | * | 7/1989 |
| JP | 2000-147507 | | 5/2000 |

* cited by examiner

*Primary Examiner* — Lauren Nguyen
(74) *Attorney, Agent, or Firm* — McKenna Long & Aldridge, LLP

(57) ABSTRACT

A LCD device and a method for manufacturing the same are disclosed which have a simplified manufacturing process and decrease the fabrication time by forming a pixel electrode without using an additional photoresist pattern. The method includes forming an electrode layer on a first substrate; forming a predetermined alignment layer pattern on the electrode layer; and forming a pixel electrode pattern by patterning the electrode layer using the alignment layer pattern as a mask.

8 Claims, 6 Drawing Sheets

LIQUID CRYSTAL DISPLAY DEVICE HAVING A PIXEL ELECTRODE PATTERN FORMED BY USING AN ALIGNMENT LAYER PATTERN AS THE MASK AND METHOD FOR MANUFACTURING THE SAME

This application claims the benefit of the Korean Patent Application No. P2006-59234, filed on Jun. 29, 2006, which is hereby incorporated by reference as if fully set forth herein.

BACKGROUND OF THE INVENTION

1. Field of the Invention

The present invention relates to a liquid crystal display (LCD) device, and more particularly, to a substrate having a pixel electrode in an LCD device.

2. Discussion of the Related Art

Generally, an LCD device includes first and second substrates facing each other, and a liquid crystal layer formed between the first and second substrates. When a voltage is applied to the LCD device, an alignment of liquid crystal molecules in the liquid crystal layer is changed so as to control light transmittance, to thereby display picture images.

Hereinafter, a related art LCD device will be explained with reference to the accompanying drawings.

FIG. 1 is a cross sectional view of a related art LCD device.

As shown in FIG. 1, a related art LCD device includes a first substrate 10, a second substrate 30, and a liquid crystal layer 70 formed between the first and second substrates 10 and 30.

The first substrate 10 includes a thin film transistor (not shown), and a pixel electrode 12 connected to the thin film transistor. Also, an alignment layer 50 for initial alignment of the liquid crystal layer 70 is formed above the pixel electrode 12.

The second substrate 30 includes a light-shielding layer 32 to prevent light leakage, a color filter layer 34 of R, G and B color resists formed on the light-shielding layer 32, and a common electrode 36 formed on the color filter layer 34. In addition, the alignment layer 50 for initial alignment of the liquid crystal layer 70 is formed on the common electrode 36.

Hereinafter, a method for forming the first substrate 10 on which the pixel electrode 12 is formed will be explained as follows.

FIGS. 2A to 2F are cross sectional views illustrating a method for forming the first substrate having the pixel electrode in the related art LCD device. Description of the thin film transistor is omitted in FIGS. 2A to 2F.

First, as shown in FIG. 2A, an electrode layer 12a for a pixel electrode is formed on the first substrate 10, and a photoresist layer 20a is formed on the electrode layer 12a.

Next, as shown in FIG. 2B, after positioning a predetermined mask 25 above the first substrate 10, light is applied to the photoresist layer 20a.

As shown in FIG. 2C, a predetermined photoresist pattern 20 is formed.

As shown in FIG. 2D, the electrode layer 12a for pixel electrode is patterned by using the photoresist pattern 20 as a mask, to thereby form a pattern of the pixel electrode 12.

As shown in FIG. 2E, the pixel electrode 12 is formed by removing the photoresist pattern 20.

As shown in FIG. 2F, the alignment layer 50 for initial alignment of the liquid crystal is formed above the pixel electrode 12, thereby completing the first substrate of the LCD device.

The above method for forming the first substrate of the LCD device according to the related art uses the additional photoresist pattern 20 to complete the pattern of the pixel electrode 12. Thus, the process for forming the photoresist pattern 20, as shown in FIGS. 2A to 2C, is necessarily required, and the process for removing the photoresist pattern 20, as shown in FIG. 2E, is also required.

Due to the processes for forming and removing the photoresist pattern 20, the related art process is more complicated, and processing time is increased.

For the mass production of the LCD device, there have been continuous research and study to simplify the process so as to decrease the fabrication cost. More particularly, there is a need for a simplified processing method for forming the pixel electrode 12 using the photoresist pattern 20.

SUMMARY OF THE INVENTION

Accordingly, the present invention is directed to an LCD device and a method for manufacturing the same, which substantially obviates one or more problems due to limitations and disadvantages of the related art.

An advantage of the present invention is to provide a method for manufacturing an LCD device having a simplified process and an reduced fabrication time by forming a pixel electrode without using an additional photoresist pattern.

Another advantage of the present invention is to provide an LCD device having a simplified manufacturing process and an reduced fabrication time by forming a pixel electrode without using an additional photoresist pattern.

Additional advantages and features of the invention will be set forth in the description which follows and in part will become apparent from the description or may be learned by practice of the invention. These and other advantages of the invention may be realized and attained by the structure particularly pointed out in the written description and claims hereof as well as the appended drawings.

To achieve these and other advantages in accordance with the purpose of the invention, as embodied and broadly described herein, a method for manufacturing an LCD device comprises forming an electrode layer for a pixel electrode on a first substrate; forming a predetermined alignment layer pattern on the electrode layer; and forming a pixel electrode pattern by patterning the electrode layer using the alignment layer pattern as a mask.

In another aspect of the present invention, an LCD device comprises first and second substrates; a pixel electrode pattern formed on the first substrate; and an alignment layer pattern formed on the pixel electrode pattern, wherein the alignment layer pattern is formed in the same pattern as the pixel electrode pattern.

In the present invention, the pixel electrode pattern is formed by using the alignment layer pattern as the mask, instead of using an additional photoresist pattern as a mask. Thus, the manufacturing process is simplified and processing time is decreased.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Hereinafter, a method for manufacturing an LCD device according to the present invention will be explained with reference to the accompanying drawings.

FIGS. 3A to 3F are cross sectional views illustrating a method for manufacturing an LCD device according to an embodiment of the present invention.

Figure 1:
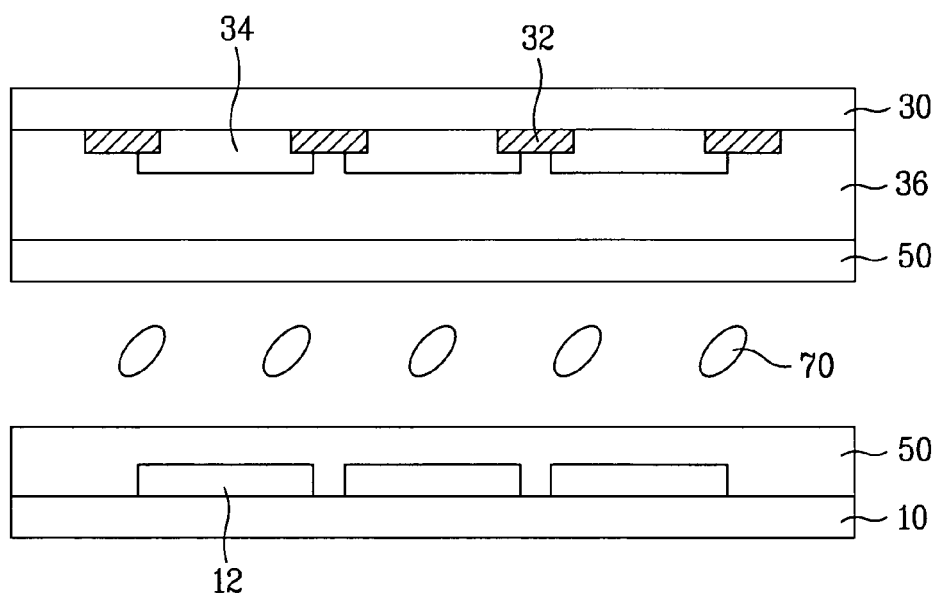
FIG. 1 is a cross sectional view of a related art LCD device.
Figure 2A:
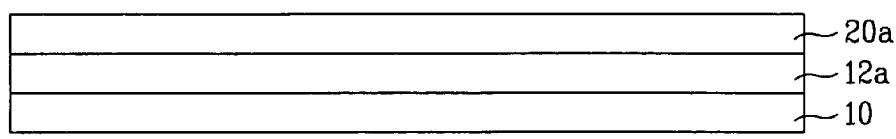
FIGS. 2A to 2F are cross sectional views illustrating a method for forming a first substrate having a pixel electrode in a related art LCD device.
Figure 2B:
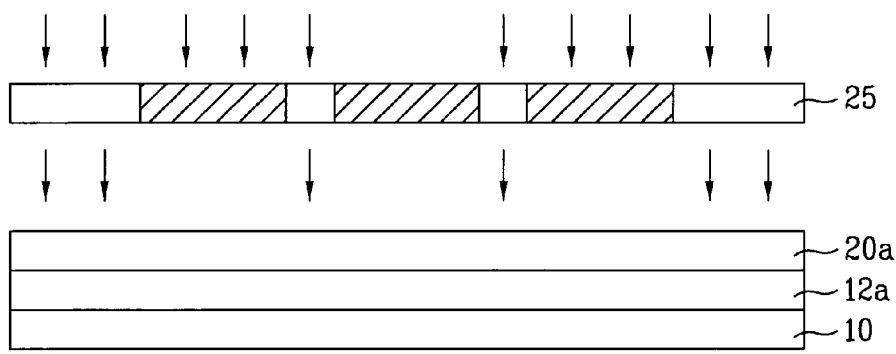
Figure 2C:
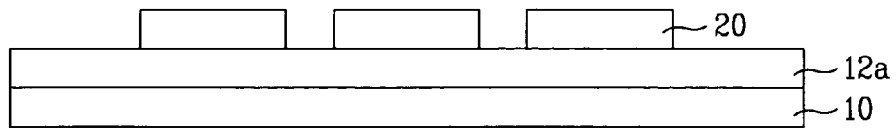
Figure 2D:
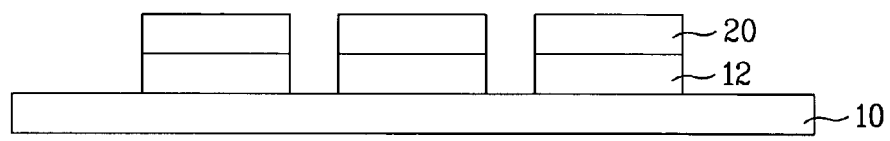
Figure 2E:
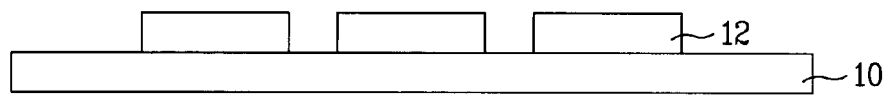
Figure 2F:
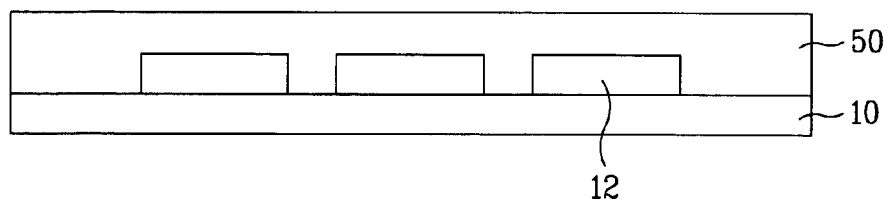
Figure 3A:
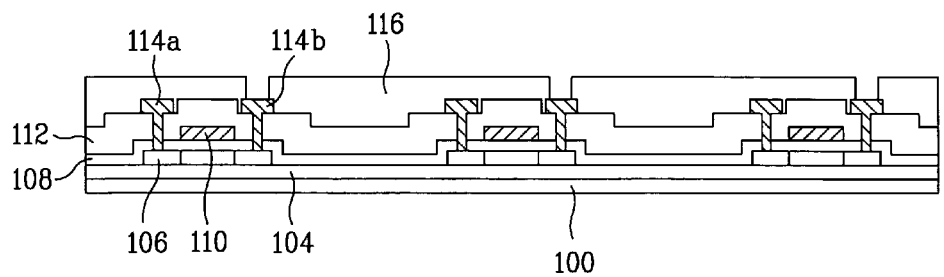
FIGS. 3A to 3F are cross sectional views illustrating a method for manufacturing an LCD device according to an embodiment of the present invention.

As shown in FIG. 3A, a thin film transistor TFT is formed on a first substrate 100.

Steps for forming the thin film transistor TFT and elements of the first substrate include forming a buffer layer 104 on an entire surface of the first substrate 100; forming an active layer 106 on the buffer layer 104; forming a gate insulating layer 108 on the entire surface of the first substrate 100 including the active layer 106; forming a gate electrode 110 on the gate insulating layer 108; forming an insulating interlayer 112 on the entire surface of the first substrate 100 including the gate electrode 110; forming a contact hole in a predetermined portion of the gate insulating layer 108 and insulating interlayer 112; forming source and drain electrodes 114a and 114b connected with the active layer 106 through the contact hole; and forming a passivation layer 116 having the contact hole therein and formed on the entire surface of the first substrate 100 including the source and drain electrodes 114a and 114b.

The buffer layer 104 may be formed of silicon oxide.

The active layer 106 has a central portion which is formed of polysilicon; and side portions which are formed of source and drain impurity regions by selectively doping n-type or p-type impurity ions. The active layer 106 is formed by a first step for forming an amorphous silicon layer, and forming a polysilicon layer through polycrystallization using laser energy; and a second step for selectively doping n-type or p-type impurity ions in the polysilicon layer using the gate electrode 110 as a mask. By performing the first and second steps, the active layer 106 is comprised of the polysilicon layer positioned below the gate electrode 110, and the source and drain impurity regions corresponding to both sides of the polysilicon layer.

The gate insulating layer 108 and the insulating interlayer 112 are formed of silicon oxide or silicon nitride.

The gate electrode 110, the source electrode 114a, and the drain electrode 114b are formed of aluminum Al, aluminum alloy, chrome Cr, tungsten W, or molybdenum Mo.

The passivation layer 116 is formed of an inorganic or organic insulating material. Also, the contact hole provided in the passivation layer 116 is formed in the portion corresponding to the drain electrode 114b. Through the contact hole provided in the passivation layer 116, the pixel electrode is connected with the drain electrode 114b.

As shown in FIG. 3A, one embodiment of the present invention is applied for the thin film transistor substrate. The thin film transistor may be formed in various shapes generally known to those skilled in the art.

Figure 3B:
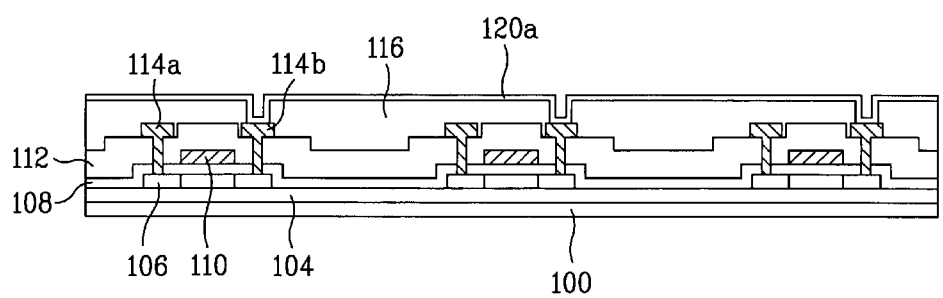

As shown in FIG. 3B, an electrode layer 120a is formed on the passivation layer 116 of the thin film transistor to form the pixel electrode. The electrode layer 120a may be formed of, for example, Indium-Tin-Oxide (ITO).

Figure 3C:
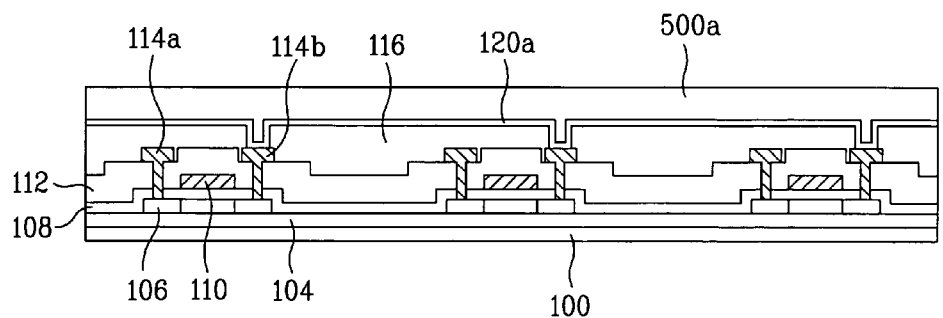

As shown in FIG. 3C, an alignment layer 500a is formed on the electrode layer 120a. The alignment layer 500a is formed of a photo-reactive polymer material, for example, a photo-reactive polyimide-based material.

Figure 3D:
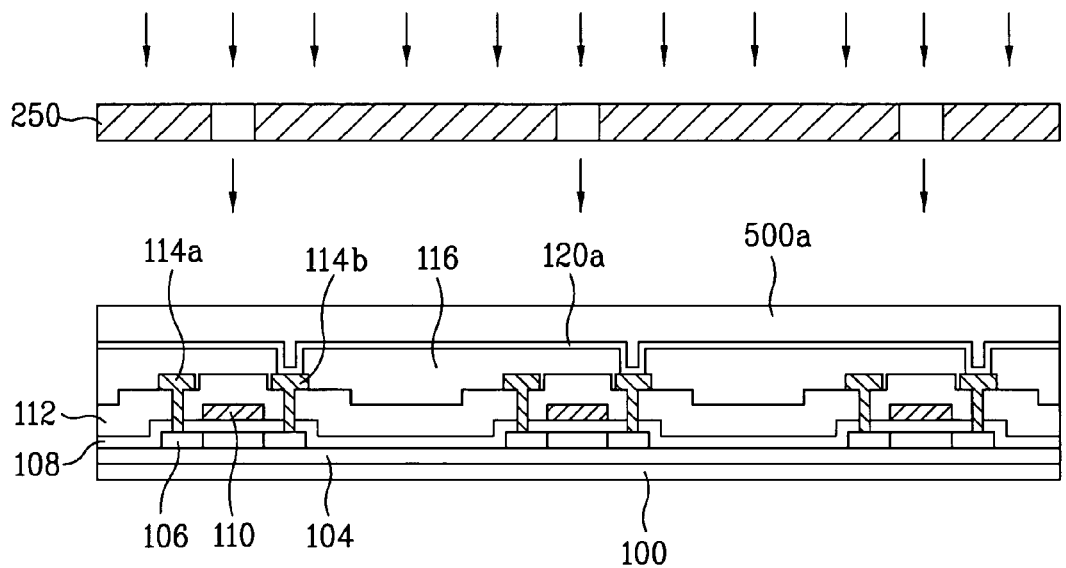

As shown in FIG. 3D, after positioning a predetermined mask pattern 250 above the substrate 100, light is applied onto the alignment layer 500a.

Figure 3E:
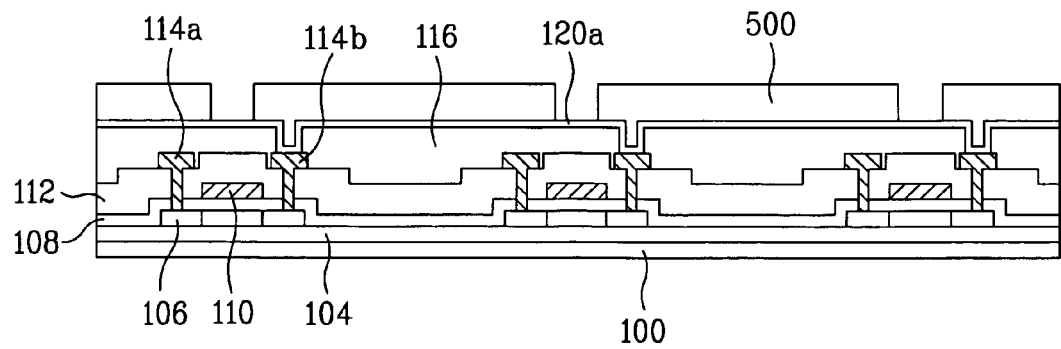

As shown in FIG. 3E, the alignment layer 500a is developed to form an alignment layer pattern 500. That is, some portions of the alignment layer 500a to which the light is applied are removed, and other portions of the alignment layer 500a to which the light is blocked are not removed, whereby the alignment layer pattern 500 is completed.

Figure 3F:
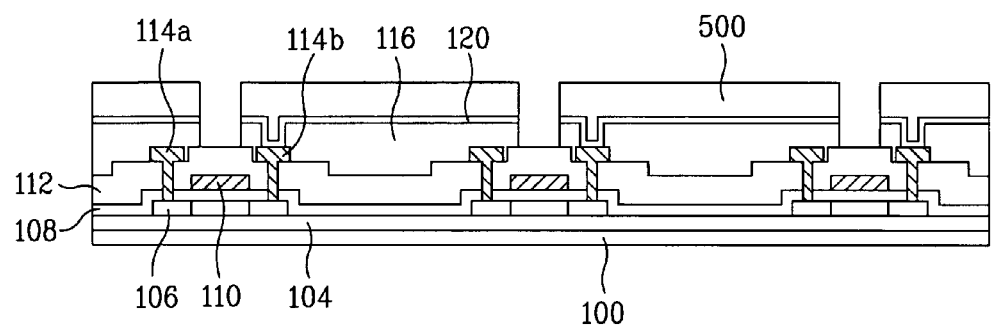

As shown in FIG. 3F, the electrode layer 120a for pixel electrode is patterned using the alignment layer pattern 500 as a mask, thereby forming a pixel electrode pattern 120.

In the related art, the pixel electrode pattern is formed using an additional photoresist pattern as the mask, whereby the processes for forming and removing the photoresist pattern are necessarily required.

However, in the case of the present invention, the pixel electrode pattern 120 is formed by using the alignment layer pattern 500 as the mask, whereby it is possible to omit the process for forming the photoresist pattern. Also, the alignment layer pattern 500 is used not only as the mask but also as an alignment layer for the initial alignment of liquid crystal, so that it is unnecessary to remove the alignment layer pattern 500 of the mask pattern.

Meanwhile, since the alignment layer pattern 500 is used for the alignment layer for initial alignment of liquid crystal, it is impossible to control the initial alignment of liquid crystal in the portion removed by patterning. However, the portion removed by patterning has no pixel electrode pattern 120, that is, the transmittance of light is blocked, whereby it has no bad effects on picture quality.

Although not shown, after forming the pixel electrode pattern 120, the alignment layer pattern 500 is aligned to a predetermined direction by rubbing the alignment layer pattern 500.

Then, although not shown, a second substrate is prepared opposite to the first substrate, and a liquid crystal layer is formed between the first and second substrates, thereby completing the LCD device.

The second substrate may be formed by steps including forming a light-shielding layer to prevent light leakage; forming a color filter layer on the light-shielding layer; forming a common electrode on the color filter layer; and forming an alignment layer on the common electrode.

The liquid crystal layer may be formed in a liquid crystal injection method or a liquid crystal dispensing method.

In the case of the liquid crystal injection method, a sealant having an inlet is formed in any one of the first and second substrates, and the first and second substrates are bonded to each other. Then, liquid crystal is injected into a space between the first and second substrates through the inlet.

In the case of the liquid crystal dispensing method, a sealant having no inlet is formed in any one of the first and second substrates, and liquid crystal is dispensed on any one of the first and second substrates. Then, the first and second substrates are bonded to each other.

Figure 4:
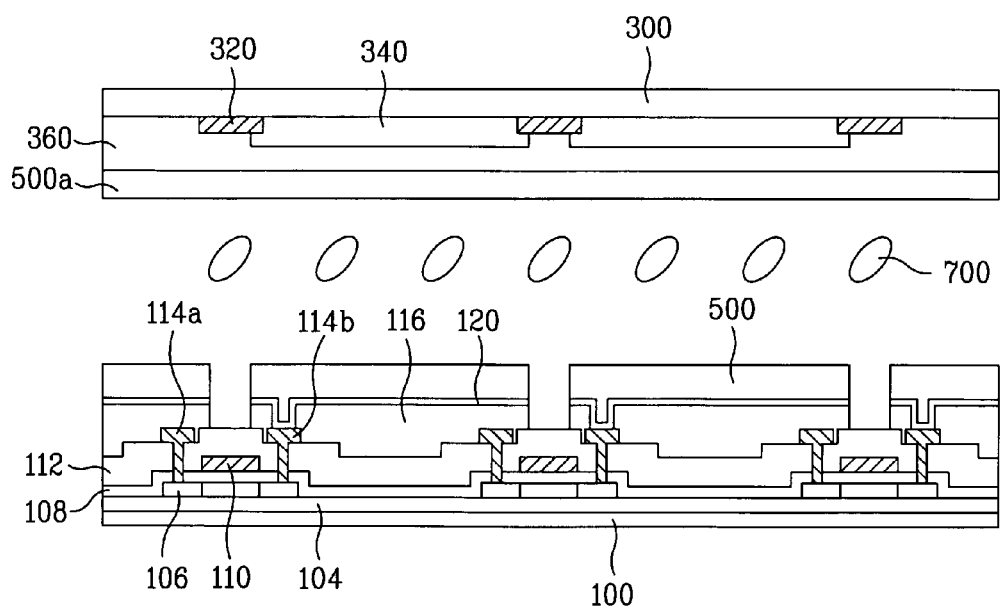
FIG. 4 is a cross sectional view of an LCD device according to an embodiment of the present invention.

FIG. 4 is a cross sectional view of an LCD device according to another embodiment of the present invention.

As shown in FIG. 4, the LCD device according to the embodiment of FIG. 4 includes a first substrate 100, a second substrate 300, and a liquid crystal layer 700 formed between the first and second substrates 100 and 300.

The first substrate 100 includes a thin film transistor, a pixel electrode pattern 120, and an alignment layer pattern 500.

The thin film transistor is comprised of a buffer layer 104; an active layer 106 formed on the buffer layer 104; a gate insulating layer 108 formed on an entire surface of the first substrate 100 including the active layer 106 and having a contact hole in a predetermined portion thereof; a gate electrode 110 formed on the gate insulating layer 108; an insulating interlayer 112 formed on the entire surface of the first substrate 100 including the gate electrode 110 and having a contact hole in a predetermined portion thereof; source and drain electrodes 114a and 114b connected with the active layer 106 through the contact hole provided in the gate insulating layer 108 and the insulating interlayer 112; and a passivation layer 116 formed on the entire surface of the first substrate 100 including the source and drain electrodes 114a and 114b and having a contact hole in a predetermined portion thereof.

The pixel electrode pattern 120 is connected with the drain electrode 114b through the contact hole provided in the passivation layer 116, wherein the pixel electrode pattern 120 is formed as a predetermined shape to be patterned in each pixel.

The alignment layer pattern 500 is formed in the same pattern as the pixel electrode pattern 120. The alignment layer pattern 500 is formed of a photo-reactive polymer material, for example, a photo-reactive polyimide-based material.

The second substrate 300 includes a light-shielding layer 320; a color filter layer 340 formed on the light-shielding layer 320; a common electrode 360 formed on the color filter layer 340; and an alignment layer 500a formed on the common electrode 360.

As mentioned above, the method for manufacturing the LCD device according to the present invention has the following advantages.

Instead of using an additional photoresist pattern as the mask, the pixel electrode pattern is formed by using the alignment layer pattern as the mask, to thereby simplify the process, and to decrease the process time.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for manufacturing an LCD device comprising:
   forming an electrode layer for a pixel electrode on a first substrate;
   forming a predetermined alignment layer pattern for an initial alignment of a liquid crystal on the electrode layer,
   wherein forming the predetermined alignment layer pattern includes:
      forming a photo-reactive polymer layer on the electrode layer;
      applying light to the photo-reactive polymer layer using a predetermined mask pattern; and
      forming the predetermined alignment layer pattern by developing the photo-reactive polymer layer to which light is applied;
   removing portions of the alignment layer pattern in an area corresponding only to a light shielding layer formed on a second substrate opposite to the first substrate and a gate electrode on the first substrate, wherein a top surface of the electrode layer is exposed; and
   forming a pixel electrode pattern in a same pattern as the alignment layer pattern and a passivation layer in the same pattern as the pixel electrode pattern by patterning the exposed electrode layer and the entire passivation layer directly below the exposed electrode layer using the alignment layer pattern as a mask.

2. The method of claim 1, further comprising:
   rubbing the alignment layer pattern after forming the pixel electrode pattern.

3. The method of claim 1, further comprising:
   forming a thin film transistor on the first substrate before forming the electrode layer.

4. The method of claim 3, wherein forming of the thin film transistor includes:
   forming a buffer layer on an entire surface of the first substrate;
   forming an active layer on the buffer layer;
   forming a gate insulating layer on the entire surface of the first substrate including the active layer;
   forming the gate electrode on the gate insulating layer;
   forming an insulating interlayer on the entire surface of the first substrate including the gate electrode;
   forming a contact hole in a predetermined portion of the gate insulating layer and insulating interlayer;
   forming source and drain electrodes connected with the active layer through the contact hole; and
   forming the passivation layer on the entire surface of the first substrate including the source and drain electrodes, the passivation layer having a contact hole in a predetermined portion thereof.

5. The method of claim 1, further comprising:
   preparing the second substrate; and
   forming a liquid crystal layer between the first and second substrates.

6. The method of claim 5, wherein the preparing of the second substrate includes:
   forming a color filter layer on the light-shielding layer;
   forming a common electrode on the color filter layer; and
   forming an alignment layer on the common electrode.

7. The method of claim 5, wherein the forming of the liquid crystal layer between the first and second substrates includes:
   forming a sealant having an inlet in one of the first and second substrates;
   bonding the first and second substrates to each other; and
   injecting liquid crystal into a space between the first and second substrates through the inlet.

8. The method of claim 5, wherein the forming of the liquid crystal layer between the first and second substrates includes:
   forming a sealant having no inlet in any one of the first and second substrates;
   dispensing liquid crystal onto any one of the first and second substrates; and
   bonding the first and second substrates to each other.

* * * * *